United States Patent
Fujita (10) Patent No.: US 8,169,867 B2
(45) Date of Patent: May 1, 2012

(54) OPTICAL DISC DRIVE APPARATUS

(75) Inventor: Kouji Fujita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 225 days.

(21) Appl. No.: 12/260,118

(22) Filed: Oct. 29, 2008

(65) Prior Publication Data

US 2009/0147632 A1    Jun. 11, 2009

(30) Foreign Application Priority Data

Dec. 5, 2007    (JP) ................................. 2007-314147

(51) Int. Cl.
*G11B 7/00* (2006.01)
(52) U.S. Cl. .................................. 369/53.14; 369/44.32
(58) Field of Classification Search .... 369/44.25–44.29, 369/44.32–44.36, 47.38–47.39, 47.44–47.46, 369/53.13–53.14, 53.2–53.23, 53.28
See application file for complete search history.

(56) References Cited

U.S. PATENT DOCUMENTS

| | | | |
|---|---|---|---|
| 4,268,745 A | 5/1981 | Okano | |
| 4,731,771 A | 3/1988 | Maeda | |
| 5,224,086 A * | 6/1993 | Wachi | 369/47.44 |
| 5,231,619 A | 7/1993 | Ohtsuka | |
| 5,646,916 A | 7/1997 | Kobayashi | |
| 6,452,882 B1 | 9/2002 | Fukamachi | |
| 6,498,772 B1 * | 12/2002 | Fujiune et al. | 369/44.29 |
| 2002/0064104 A1 * | 5/2002 | Park et al. | 369/44.32 |
| 2002/0118618 A1 * | 8/2002 | Cho et al. | 369/53.14 |
| 2002/0141303 A1 * | 10/2002 | Kim | 369/44.32 |
| 2003/0016607 A1 * | 1/2003 | Cho et al. | 369/47.42 |

FOREIGN PATENT DOCUMENTS

| | | |
|---|---|---|
| EP | 0 183 303 | 6/1986 |
| JP | 2-78021 | 3/1990 |
| JP | 10-021571 | 1/1998 |
| JP | 2004-171610 | 6/2004 |

OTHER PUBLICATIONS

Japanese Office Action (Notice of Reasons for Rejection), dated Feb. 28, 2012, issued in corresponding Japanese Patent Application No. 2007-314147.

* cited by examiner

*Primary Examiner* — Nathan Danielsen
(74) *Attorney, Agent, or Firm* — Antonelli, Terry, Stout & Kraus, LLP.

(57) ABSTRACT

In an optical disc drive apparatus, when a start time of a tracking pull-in operation is adjusted according to the eccentricity amount of the optical disc, a suitable starting point of the tracking pull-in operation can be always captured and the pull-in operation of the tracking control can be stably performed, without depending on the eccentricity amount of the optical disc. Further, the eccentricity amount and an eccentricity phase are detected from a track zero crossing signal before the tracking pull-in, and an eccentricity compensation signal of the track is added to the tracking control signal. As a result, also in the optical disc with the large eccentricity amount, the tracking pull-in operation can be stably performed.

1 Claim, 7 Drawing Sheets

OPTICAL DISC DRIVE APPARATUS

INCORPORATION BY REFERENCE

The present application claims priority from Japanese application JP 2007-314147 filed on Dec. 5, 2007, the content of which is hereby incorporated by reference into this application.

BACKGROUND OF THE INVENTION

1. Field of the Invention

The present invention relates to a technique for adding to a tracking controller an eccentricity compensation control signal according to an eccentricity amount and angular velocity of an optical disc and for improving accuracy of a tracking pull-in in an optical disc drive apparatus, particularly, in a previous stage of the tracking pull-in.

2. Description of the Related Art

Accuracy of tracking pull-in is caused by a period of a track zero crossing signal due to an eccentricity amount of an optical disc. Since a response band of a tracking control has a finite value, the tracking pull-in is started at a track zero crossing position at which a track zero crossing period is maximized. After the tracking pull-in, a rotation frequency component and amplitude component of the optical disc contained in a tracking control signal are extracted and the extracted components are added as a feed-forward to the tracking control signal. Thereby, a steady tracking error can be reduced and tracking accuracy can be improved. The above is described in Japanese Unexamined Patent Application Publication No. Hei 10-21571.

SUMMARY OF THE INVENTION

A first object of the present invention is that when a track zero crossing period value for starting a tracking pull-in varies according to an eccentricity amount of an optical disc and further, a start point of the tracking pull-in is always and surely set to a maximum of the track zero crossing period value, accuracy of the tracking pull-in is improved.

A second object of the present invention is that in a previous stage for starting the tracking pull-in, when an eccentricity compensation level and an eccentricity compensation phase varies according to the eccentricity amount and angular velocity of the optical disc, the eccentricity amount is relatively low suppressed.

The above-described object is attained by the present invention described in the scope of claims.

Also when the eccentricity amount of the optical disc is large, the accuracy of the tracking pull-in can be greatly improved.

DESCRIPTION OF THE EMBODIMENTS

Hereinafter, one embodiment for performing the present invention will be described. Focus control and focusing operations will not be here described. Assuming a state where focusing is performed by a focus control of an optical disc, embodiments will be described below. Problems on a starting point of tracking servo pull-in will be first described with reference to a waveform chart of FIG. 3.

Figure 3:
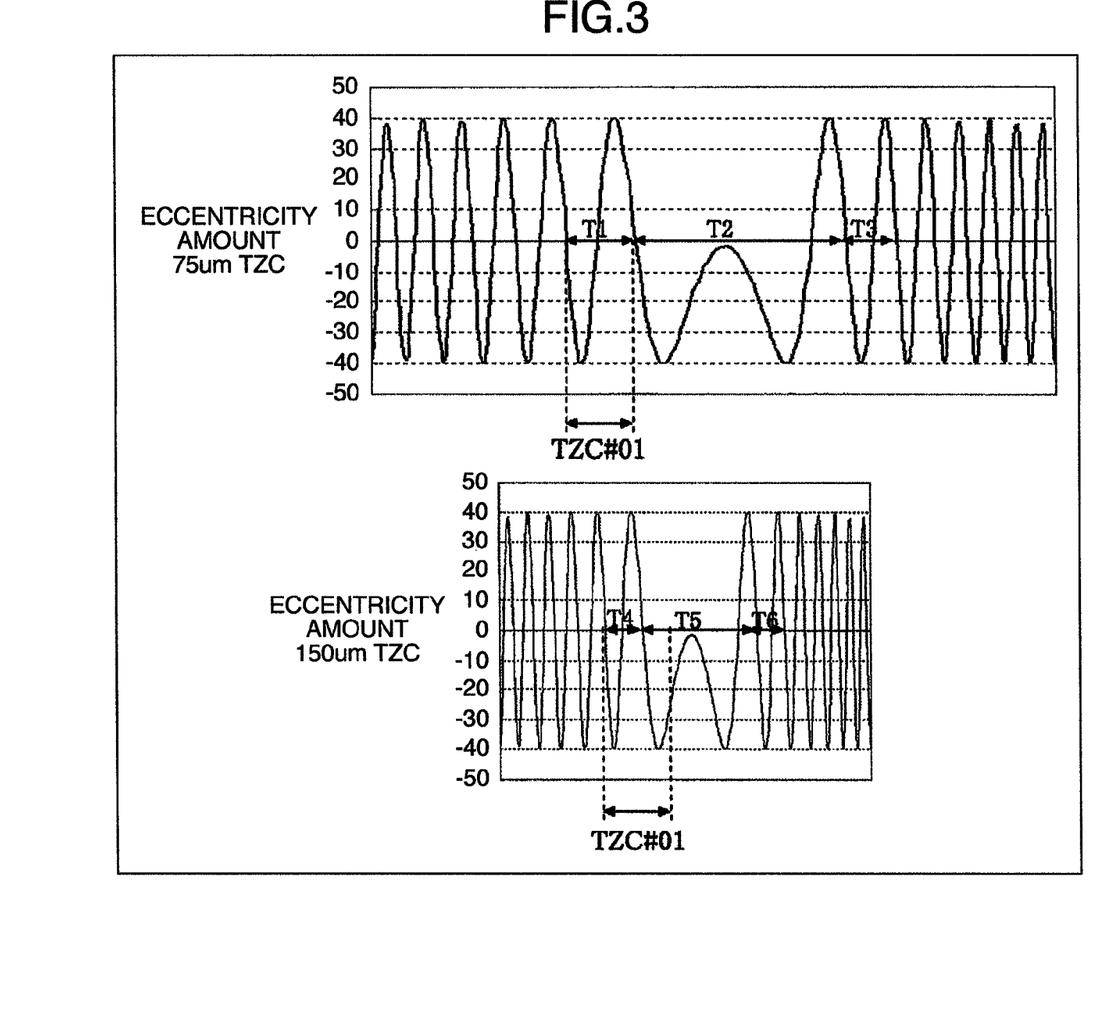
FIG. 3 is a waveform chart showing a tracking error signal when a tracking servo is turned off.

FIG. 3 is a waveform chart showing a tracking error signal when the tracking servo is turned off. In the optical disc, an eccentricity mechanically occurs between the center of the mounted optical disc and a rotation axis. The eccentricity amounts become different from each other due to the accuracy of an optical disc mounting mechanism and the eccentricity amount of about 80 to 150 μm normally occurs. Relative to the optical disc in which the eccentricity amount of, for example, 75 μm occurs, when the optical disc is rotated in a state where the tracking control is turned off, the tracking error signal is shown in a waveform chart in FIG. 3 of TZC signal with the eccentricity amount of 75 μm. Whenever a laser spot for traces on the optical disc crosses a track, a tracking error signal is outputted by one period (T1 shown in FIG. 3) (T3 shown in FIG. 3). A track zero crossing period is maximized (T2) at a return point of a spiral track eccentricity.

On the other hand, in the track zero crossing signal, as the eccentricity amount more increases (e.g., the eccentricity amount of 150 μm) as shown in the TZC signal with the eccentricity amount of 150 μm of a waveform chart in FIG. 3, a track zero crossing period is more reduced as shown in T4 to T6 therein. A feedback tracking control is applied to a zero point on the vertical axis (Y axis) of each waveform chart, thereby performing the tracking control.

The minimum track zero crossing period (hereinafter, referred to as TZC) in a starting point of the tracking pull-in is determined by a response period of the feedback tracking control. Accordingly, the starting point of the tracking pull-in is less than the response period, even if only slightly. The tracking pull-in, when performed at a point at which the TZC period is maximized, can be surely performed.

For example, the minimum TZC period in the starting point of the tracking pull-in determined by a response period of the tracking servo according to the present embodiment is set as a TZC #01 of the TZC signal with the eccentricity amount of 75 μm in FIG. 3. A TZC signal with a period equal to or smaller than that of the TZC #01 is detected and the tracking pull-in operation is started during the next TZC period. In a waveform of the TZC signal with the eccentricity amount of 75 μm in FIG. 3, the tracking pull-in operation can be performed during the T2 period. However, in a waveform of the TZC signal with the eccentricity amount of 150 μm in FIG. 3, when the TZC #01 for determining the starting point of the tracking pull-in is left set, the TZC period for starting the tracking pull-in is detected at a point of T5 and therefore, the tracking pull-in is started during the next TZC period T6. When the TZC period of T6 is sufficiently shorter than a response period of the tracking servo, a response period of the tracking pull-in cannot be followed and therefore, the tracking pull-in fails in many cases.

First Embodiment

To take measures, in a first embodiment, an apparatus is structured such that a starting point of the tracking pull-in is changed according to the eccentricity amount. By doing so, a starting point of the tracking pull-in can be always set to the maximum TZC period as a return point of the eccentricity without being affected by the eccentricity amount.

Figure 1:
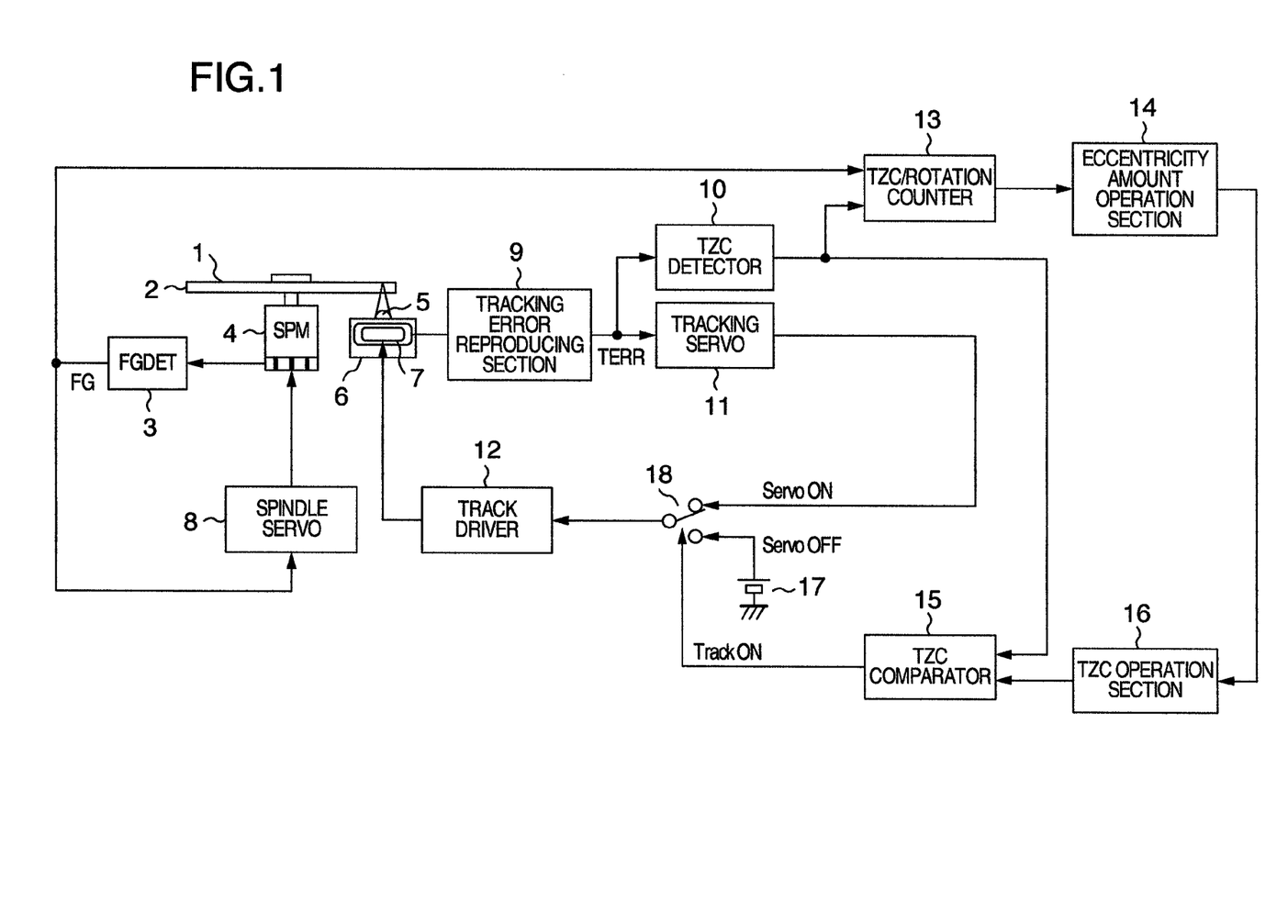
FIG. 1 is a block diagram showing a first embodiment of an optical disc drive apparatus according to the present invention.

FIG. 1 is a block diagram showing a first embodiment of an optical disc drive apparatus according to the invention. Reference number 1 denotes an optical disc chucking section, reference number 2 denotes an optical disc, reference number 3 denotes a spindle tacho-pulse detector that detects a rotation angle of the optical disc, reference number 4 denotes a spindle motor, reference number 5 denotes a convex lens, reference number 6 denotes an optical pickup main body, reference number 7 denotes a track actuator, reference number 8 denotes a spindle servo that subjects the optical disc to a rotation control drive at a constant speed, reference number 9 denotes a tracking error reproducing section that detects a tracking error signal of the optical disc, reference number 10 denotes a TZC detector, reference number 11 denotes a tracking servo that performs a follow-up control of a track on the optical disc, reference number 12 denotes a track driver that drives an optical pickup main body in the radius direction, reference number 13 denotes a TZC/rotation counter, reference number 14 denotes an eccentricity amount operation section that detects an eccentricity amount of the optical disc, reference number 15 denotes a TZC comparator, reference number 16 denotes a TZC operation section, reference number 17 denotes a reference voltage unit, and reference number 18 denotes a switch circuit that starts or stops a track controller.

The optical disc 2 is almost centered and mounted on a central part of the optical disc to a rotation axis of the spindle motor 4 by the optical disc chucking section. From the spindle motor 4, signals proportional to the rotation frequency of the spindle motor are outputted. The spindle tacho-pulse detector 3 shapes a waveform of the signal and inputs the signal as an FG signal to the spindle servo 8. The spindle servo 8 controls as a drive signal outputted to the spindle motor 4 a difference between a target angular velocity of the spindle motor and the present angular velocity of the spindle motor obtained from the FG signal, through a negative feedback loop. Thereby, the spindle motor is rotated at the constant speed.

In the tracking control, the optical pickup main body operates so as to trace the center of a spiral track on the optical disc 2. To realize the tracking control, laser light is focused and reflected through the lens 5 to the optical disc 2 from the optical pickup main body 6 to thereby read in track reproduction signals on the optical disc. The track reproduction signal is outputted, for example, with a voltage of 0 V when a laser spot focused on the track irradiates a track center. Further, the track reproduction signal is outputted with a negative voltage proportional to an off track value deviated from the track to the inner peripheral side, while the signal is outputted with a positive voltage proportional to an off track value deviated from the track to the outer peripheral side. These signals are generated by the Track Err reproducing section 9 and inputted as a TERR signal to the tracking servo 11.

The tracking servo 11 includes an advance compensator and a delay compensator. The tracking servo 11 includes the respective compensators so that the tracking control of the optical pickup main body 6 can be correctly performed without being oscillated. Tracking servo signals outputted from the tracking servo 11 are inputted to the track driver 12. Tracking drive signals outputted from the track driver are inputted to the track actuator 7. When the track actuator 7 moves the lens 5 either in the inner peripheral direction or in the outer peripheral direction of the tracks, the tracking error signal is subjected to negative feedback control. Thereby, the tracking control is realized.

The switch 18 for starting or stopping the tracking control is turned on (Servo ON) to start the tracking control. When the switch 18 is turned off (Servo OFF), an actuator drive voltage is fixed to the reference voltage unit 17 to stop the tracking control.

Figure 6:
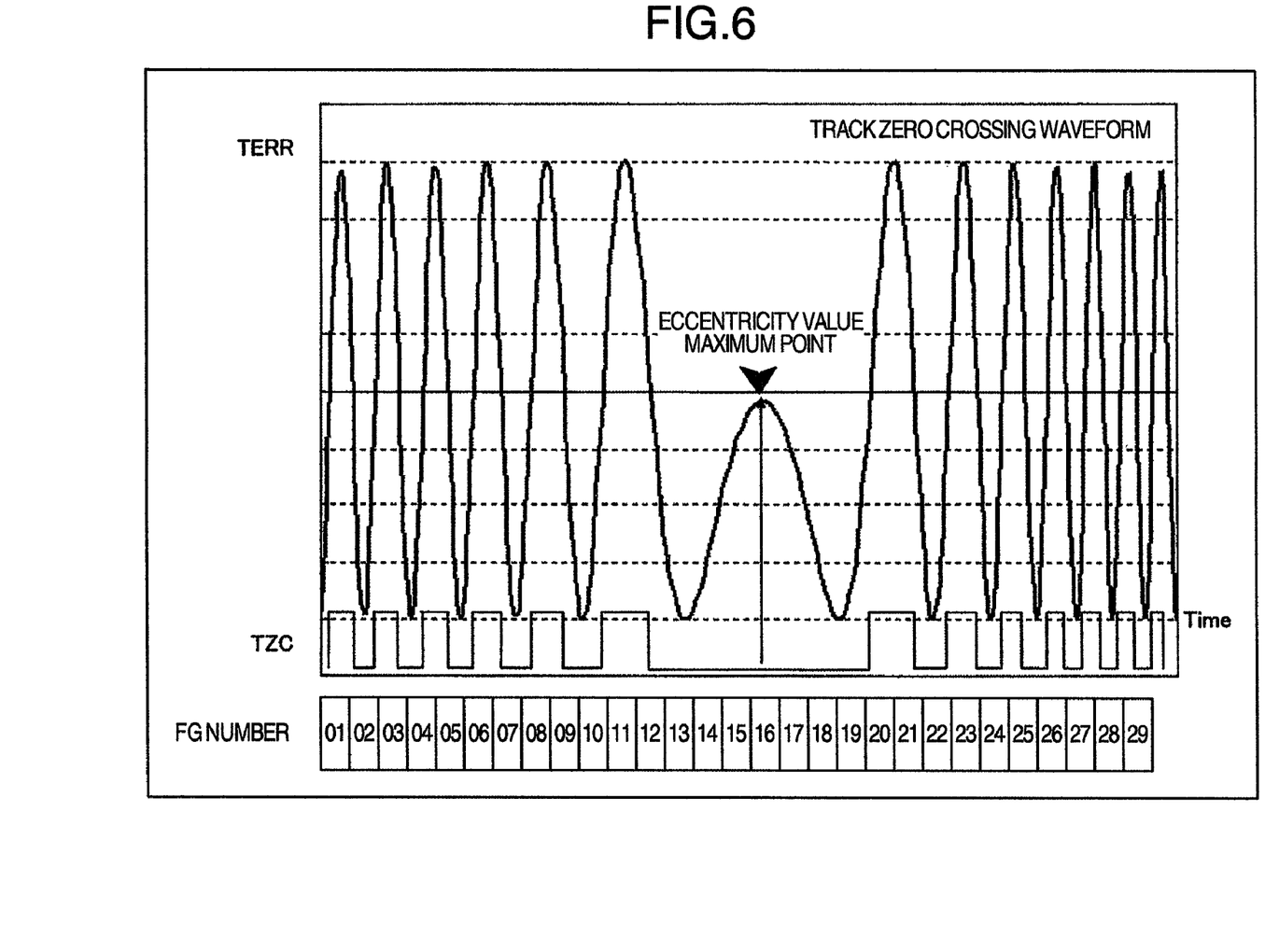
FIG. 6 is a view showing a TERR signal, TZC signal, and FG signal when there is stopped a tracking control according to the first embodiment of the invention.

Operations for calculating the eccentricity amount of the optical disc from a track zero crossing signal will be described below with reference to FIG. 6. FIG. 6 shows a TERR signal (tracking error signal), TZC signal, and FG number resulting from sequentially giving a number to an FG signal when the tracking control is stopped. Since the track zero crossing signal is described with reference to the FIG. 3, a description of the waveform is here omitted. The TZC signal is a state value signal showing a HI level at an electric potential equal to or greater than that of 0 V and a LOW level at an electric potential smaller than that of 0 V of the TERR signal. The number of rise edges of the TZC signal corresponds to the number of track zero crossing times. An FG signal is, for example, a square wave signal, 60 pulses of which are outputted during one rotation of the spindle motor. A number 0 is allocated to an arbitrary pulse and numbers up to 59 are allocated during one rotation of the spindle motor.

Herein, the number of pulses outputted during one rotation of the spindle motor is a number for explaining the operation; the present invention is not limited to 60 pulses. This FG number is used for measuring the number of pulses outputted during one rotation of the spindle motor. To measure the eccentricity amount of the optical disc, it can be calculated by multiplying a track pitch and half of a value obtained by measuring the TZC signals outputted during one rotation of the optical disc. For example, when the track pitch is 0.32 μm and the number of TZC signals detected during one rotation of the optical disc is 300, the eccentricity amount is 96 μm. This operation is performed by the eccentricity amount operation section 14 of FIG. 1, and the counting of the TZC signals detected during one rotation of the optical disc is measured by the TZC/rotation counter 13.

Operations of a start cause of the tracking pull-in will be described below with reference to FIG. 1. As previously explained in a waveform chart of FIG. 3, a track zero crossing point at which the TZC period is maximized is essential to a starting point of the tracking pull-in. In FIG. 1, the present TZC signal is pulled in by the TZC comparator 15 and its period value is digitized. On the other hand, numerical data (target TZC period) of the TZC period value for starting the tracking pull-in is inputted from the TZC operation section 16 to the TZC comparator 15. The TZC comparator 15 determines whether the present TZC period is larger than the target TZC period. If the present TZC period is equal to or smaller than the target TZC period, the comparator 15 switches the switch 18 from Servo OFF to Servo On. Thereby, the tracking servo can be operated at the track zero crossing point at which the TZC period is maximized.

On the other hand, as explained in the waveform chart of FIG. 3, the track zero crossing period is different from each other due to a difference between the eccentricity amounts. When the target TZC period has a fixed value, there occurs a problem that the tracking pull-in point deviates from the optimum point. To take measures, the apparatus is structured such that the eccentricity amount results of the optical disc measured before the tracking pull-in is inputted to the TZC operation section 16 and the target TZC period varies according to the eccentricity amount.

The target eccentricity TZC is calculated, for example, by a formula; the target eccentricity TZC=the reference TZC period×80 μm/the present eccentricity amount (μm); when the present eccentricity amount is equal to or larger than 80 μm. On the other hand, if smaller than 80 μm, the TZC can be obtained, for example, by a formula; the target eccentricity TZC=the reference TZC period.

The TZC period value for determining the tracking pull-in according to the eccentricity amount is set to be in an inverse proportion, whereby the tracking pull-in operation can be always performed at a point at which the track zero crossing period is maximized and the accuracy of the tracking pull-in can be improved. Herein, 80 μm is a value used for explaining the operation and a value changed according to a response frequency of the tracking servo; the present invention is not limited to this value.

Second Embodiment

Hereinafter, a second embodiment will be described. As the eccentricity amount before the tracking pull-in is more reduced, the accuracy of the tracking pull-in is higher. However, alignment accuracy of the optical disc also deteriorates due to reduction in mechanism accuracy associated with inexpensive materials. In such a condition, the eccentricity amount of 150 μm occurs at the maximum in the whole mechanism and optical disc. Therefore, the TZC period for starting the tracking pull-in cannot pull in the track at the tracking servo response frequency in some cases. Therefore, in a state before the tracking pull-in, the relative eccentricity amount between the optical pickup main body and the optical disc is reduced, thereby improving the accuracy of the tracking pull-in. The optical pickup main body before the tracking pull-in is synchronized with the eccentricity of the optical disc to drive the track actuator in the radius direction, thereby realizing improvement in the accuracy of the tracking pull-in.

Figure 7:
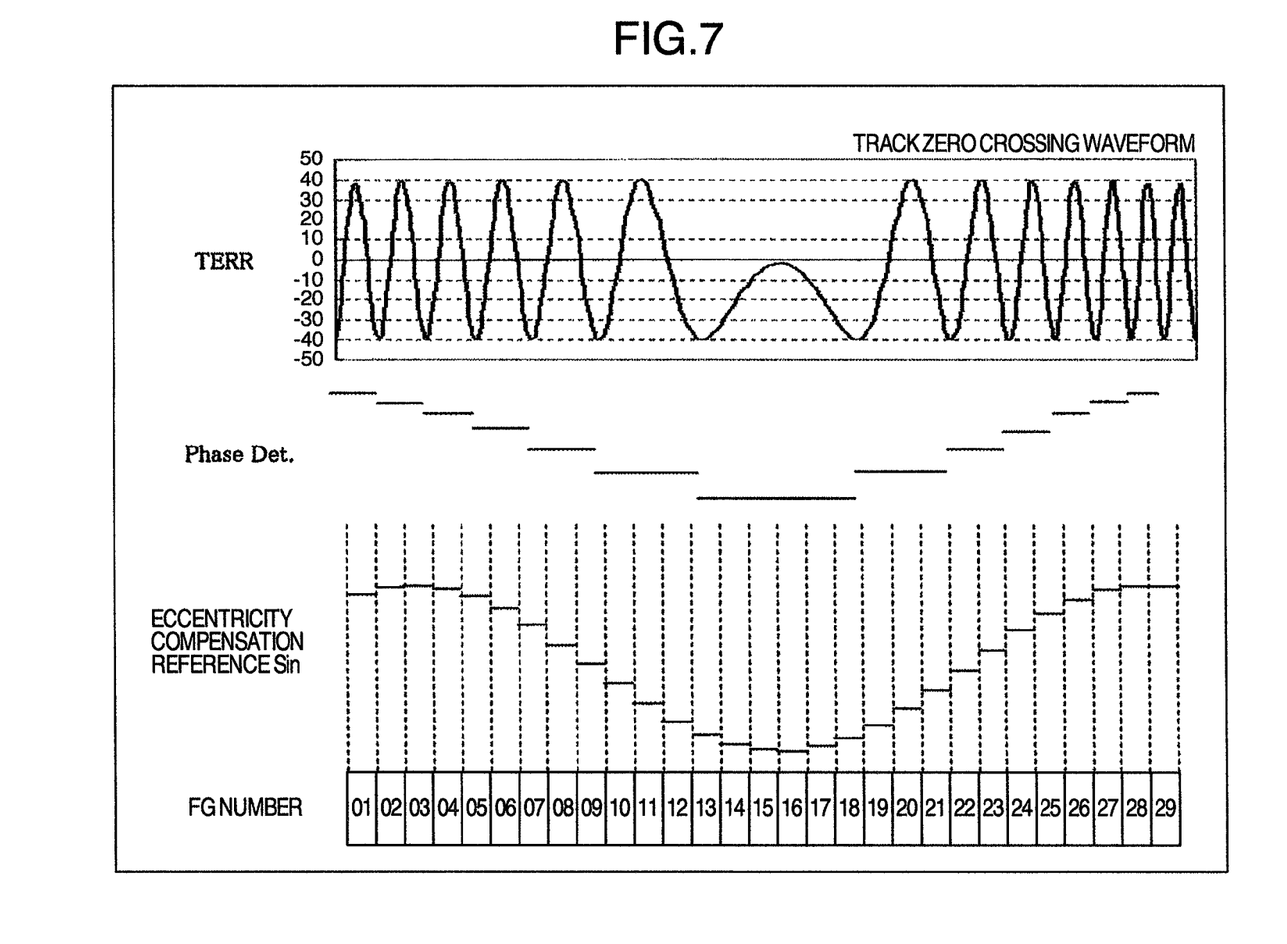
FIG. 7 is a waveform chart showing a track zero crossing signal before a tracking pull-in according to the first embodiment of the invention.

For that purpose, detection of the eccentricity amount before the tracking pull-in and generation of the eccentricity compensation drive signal for synchronizing the track actuator with the eccentricity to be driven are required. The eccentricity compensation drive signal will be first described with reference to a waveform chart of FIG. 7. A waveform of the TERR signal in FIG. 7 shows that of a tracking error signal before the tracking pull-in. A distance between the center of rotation axis of the optical disc and the track varies according to the rotation angle of the optical disc, and the eccentricity amount is maximized at a point at which the distance is maximized. The tracking error signal shown in the TERR signal of the waveform chart in FIG. 7 shows a condition where the TZC period is maximized at a point at which the eccentricity amount is maximized. The waveform in the Phase Detector of FIG. 7 is obtained by plotting the TZC period value as the vertical axis (Y axis). It is understood that an eccentricity phase of the optical disc before the tracking pull-in can be detected from the waveform in the Phase Detector.

The track actuator drive signal that is synchronized with the waveform outputted from the Phase Detector will be described below with reference to the waveform chart of FIG. 7. Sinusoidal one period pattern data detected during one rotation of the optical disc is equally divided into a plurality of parts, for example, into 60. Then, the pattern data divided into 60 during one rotation of the optical disc is previously stored as SIN waveform data. The pattern data divided into 60 is generated, for example, by a tacho pulse generator from which a spindle FG signal made of 60 pulses is outputted during one rotation of the optical disc. When the waveform data is sequentially outputted for each FG number, a sinusoidal waveform shown in an eccentricity compensation reference sinusoidal waveform chart of FIG. 7 can be generated. For example, in the eccentricity phase of the optical disc, the eccentricity amount is maximized at a point at which a Phase Detector signal is minimized. Accordingly, when a phase of the sinusoidal waveform shown in the eccentricity compensation reference sinusoidal waveform chart is allowed to coincide with a phase in the Phase Detector, a track actuator drive signal synchronized with a waveform in the Phase Detector can be generated. The processing for allowing the phase to coincide with each other can be realized as follows. That is, for example, the sinusoidal waveform data is outputted by carrying out the FG number×n phase shift operations such that the sinusoidal waveform data corresponding to the FG number of 16 is outputted at the timing at which a phase in the Phase Detector is minimized. The constituent elements and their operations will be described with reference to FIG. 2.

Figure 2:
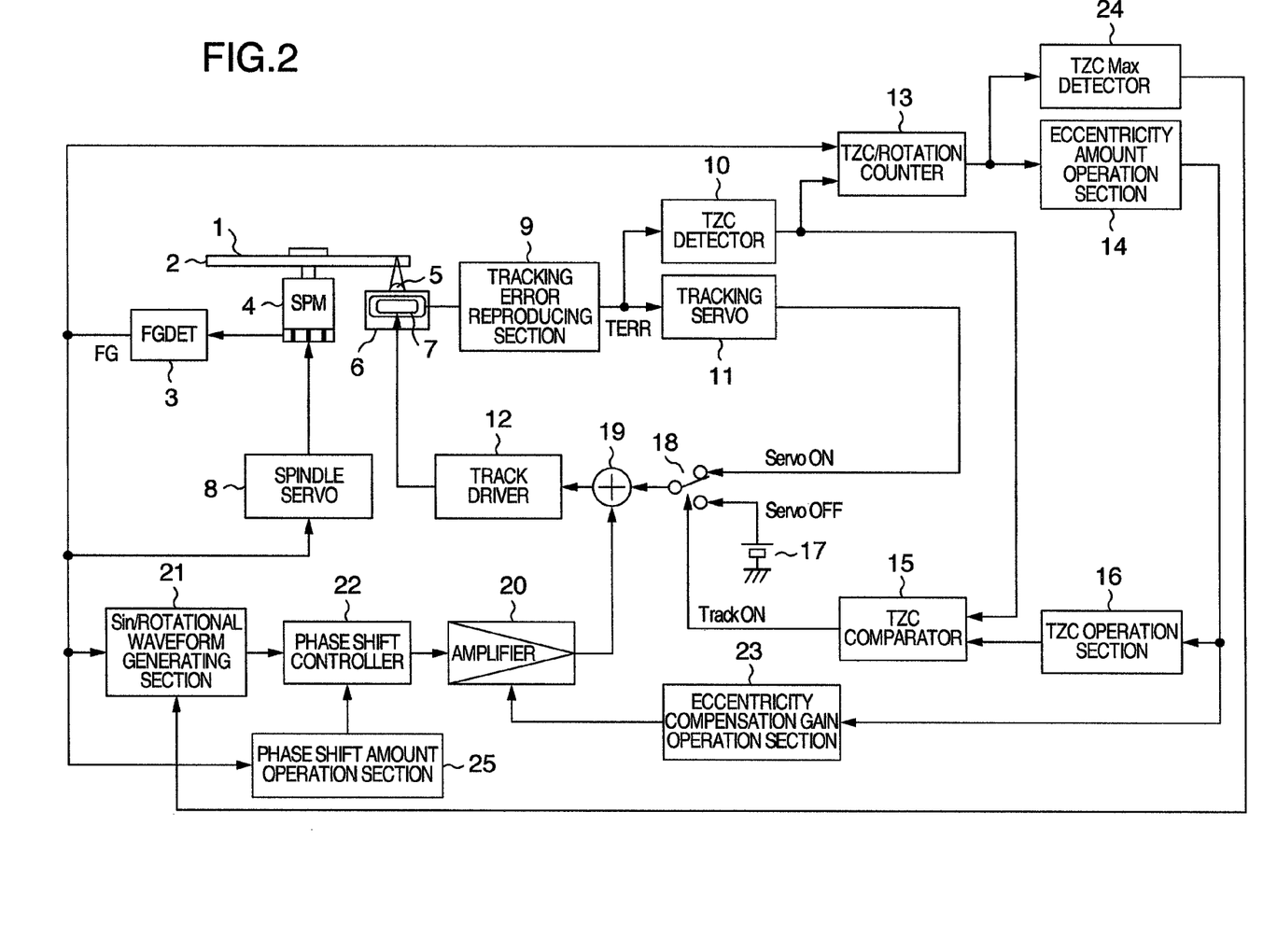
FIG. 2 is a block diagram showing a second embodiment according to the present invention.

FIG. 2 is a block diagram showing a second embodiment according to the present invention. Descriptions on the same functional block as that of FIG. 1 will be omitted. In FIG. 2, reference numeral 19 denotes an adder for adding an amplifier output signal and a tracking control signal, reference numeral 20 denotes an amplifier for increasing and decreasing an eccentricity compensation reference signal according to an eccentricity amount detection result, reference numeral 21 denotes a sinusoidal/rotational waveform generating section for outputting a sinusoidal signal according to a rotation angle of the optical disc, reference numeral 22 denotes a phase shift controller for shifting a phase of the eccentricity compensation reference signal relative to a rotation angle of the optical disc according to an angular velocity detection result, reference numeral 23 denotes an eccentricity compensation gain operation section, and reference numeral 24 denotes a TZC Maximum detector. The FG signal synchronized with the rotation of the optical disc is inputted to the sinusoidal/rotational waveform generating section 21 and then, the sinusoidal waveform data is sequentially outputted for each rise of the FG signal.

The TZC Maximum detector 24 detects a timing at which the negative eccentricity amount is maximized to the optical pickup main body and then, sends the eccentricity phase timing of the optical disc to the sinusoidal/rotational waveform generating section 21, for example, at a point at which the negative eccentricity amount is maximized. Here, the eccentricity amount may be the maximum positive value; but the negative eccentricity amount will be used below for the purpose of explaining the operations. The sinusoidal/rotational waveform generating section 21 operates so as to sequentially output the sinusoidal waveform data to the amplifier 20 by starting from, for example, the waveform data that is synchronized with the eccentricity phase timing and whose amplitude value is minimized. By the above-described structure, the eccentricity compensation reference sinusoidal signal that is synchronized with the eccentricity phase timing of the optical disc can be generated.

Determination of an amplitude value of the eccentricity compensation reference sinusoidal signal will be described below. A level of the eccentricity compensation drive signal to be inputted to the track actuator must be determined according to the eccentricity amount of the optical disc. In the structure of FIG. 2, an amplification factor of the amplifier 20 increases and decreases based on the eccentricity amount calculation result. In the amplification factor (sensitivity) of the amplifier 20, one sensitivity Kdrv of the track driver 12 and another sensitivity Ktr of the track transition quantity relative to an input drive voltage of the track actuator 8 are given. For example, when the detected eccentricity amount of the optical disc is 150 μm, the sensitivity of the amplifier 20 can be calculated from 150 μm/Ktr/Kdrv. The eccentricity amount detection result is inputted to the eccentricity compensation gain operation section 23 from the eccentricity amount operation section 14 and then, the arithmetic processing is performed by the section 23. By the above-described structure, when a phase and level of the eccentricity compensation reference sinusoidal signal are adjusted based on the eccentricity amount before the tracking pull-in, the relative eccentricity amount between the optical pickup main body and the optical disc can be reduced and the accuracy of the tracking pull-in can be improved.

Hereinafter, a rotation angular velocity of the optical disc and a phase of the eccentricity compensation reference sinusoidal signal will be described. The track actuator 7 for driving the optical pickup main body 6 controls a track position by a balance between an acceleration caused by the electromagnetic conversion and a spring force caused by a mechanical spring. Accordingly, a response frequency relative to the control signal outputted from the track driver 12 for controlling the track actuator 7 has a finite value, and a frequency to the same gain response as that at DC is about from 50 to 80 Hz.

Figure 4:
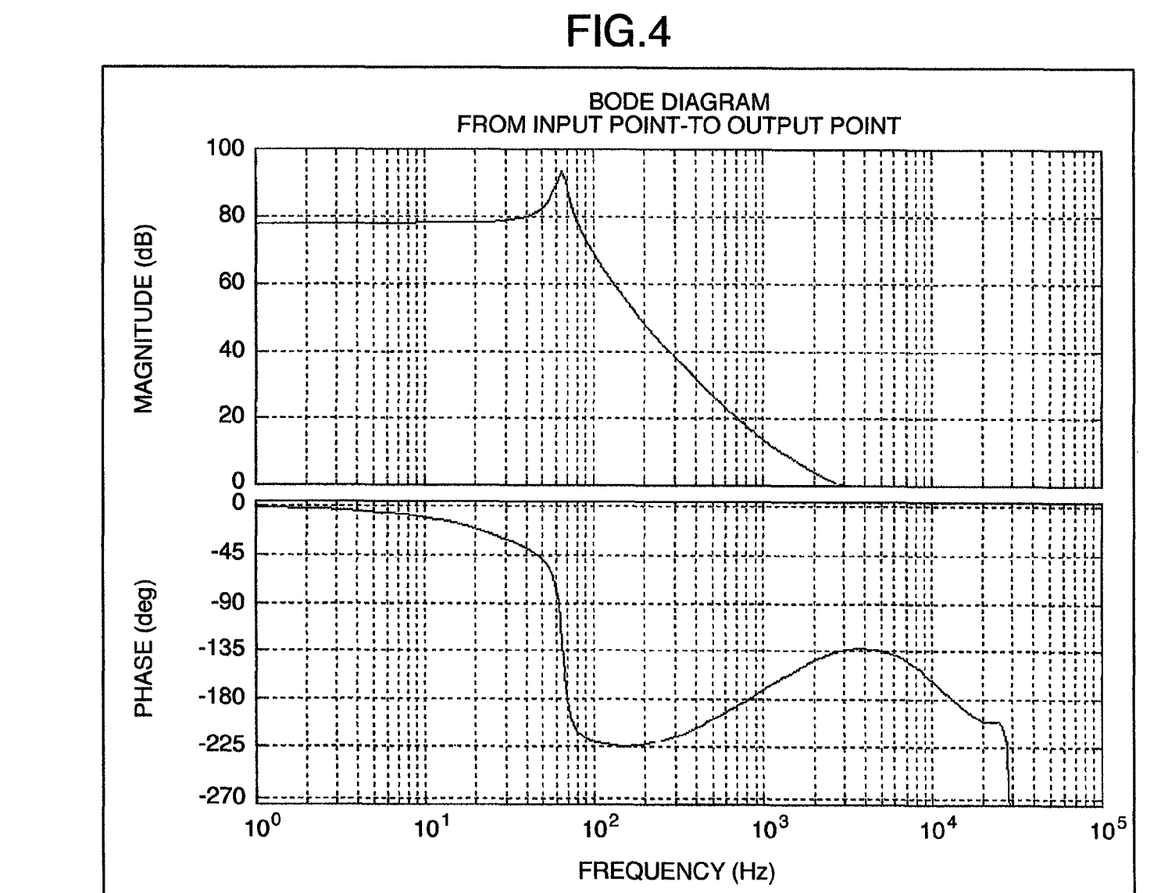
FIG. 4 is a view showing a tracking servo loop gain and phase characteristic examples according to the first embodiment of the invention.

Here, assume that the response frequency is 60 Hz for the purpose of explaining the operations. FIG. 4 shows a total frequency characteristic (Magnitude) and phase characteristic (Phase) of the tracking error reproducing section 9, the tracking servo 11, the track driver 12, and the track actuator 7. The horizontal axis represents the response frequency of the track actuator. Since a track radius position continuously varies according to the eccentricity amount, this response frequency may be viewed as a rotation frequency (the number of disc rotations per second of unit of time) of the optical disc. On the other hand, focusing on the phase characteristic, for example, when the rotation frequency of the optical disc is 30 Hz, the phase lag is 30 degrees, whereas when the rotation frequency of the optical disc is 70 Hz, the phase lag is 180 degrees. The above-described fact shows a phase difference between the eccentricity compensation reference sinusoidal signals. In other words, the phase shift processing must be performed to the eccentricity compensation reference sinusoidal signal according to the rotation frequency of the optical disc. In the present embodiment, for the purpose of realizing the processing, the eccentricity compensation reference sinusoidal signal outputted from the sinusoidal/rotational waveform generating section is inputted to the phase shift controller 22 and then, the phase lag shift amount is adjusted, for example, by degree. Alternatively, the phase lead shift amount may be adjusted by degree.

Here, the adjustment of the phase lag shift amount will be assumed and described for the purpose of explaining the operations. The phase lag shift amount is adjusted by the phase shift amount operation section 25. The FG signal obtained from the FGDET 3 is inputted to the phase shift amount operation section 25 and then, the section 25 detects the rotation frequency of the optical disc. The total frequency characteristic (Magnitude) and phase characteristic (Phase) of the FIG. 4 are given. Therefore, the control signal used for a phase lag adjustment according to the rotation frequency is inputted to the phase shift controller 22, thereby realizing the phase lag shift adjustment. The phase shift amount operation section 25 generates data of the total frequency characteristic (Magnitude) and phase characteristic (Phase) of FIG. 4, for example, data in a form of the phase amount to the frequency and stores the data in a memory within the section 25. Further, the section 25 inputs the phase shift amount according to the rotation frequency of the optical disc to the phase shift controller 22.

Figure 5:
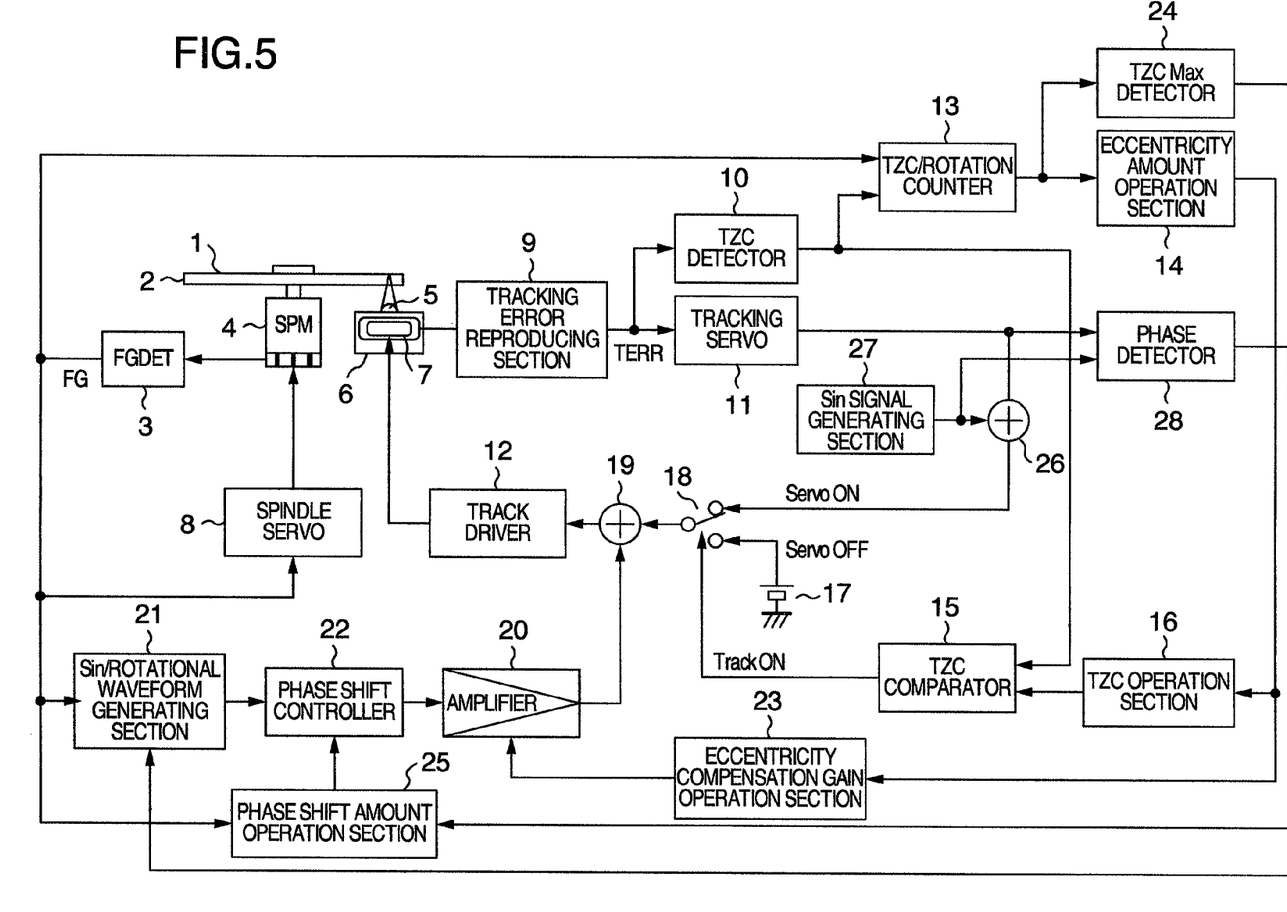
FIG. 5 is a view showing generation of a phase shift data for compensating eccentricity according to the second embodiment of the invention.

A method of generating the phase amount data to the frequency by the phase shift amount operation section 25 will be described below. FIG. 5 shows a block diagram. Descriptions of the same functional block as that of FIG. 2 will be omitted. Reference numeral 26 denotes an adder for adding to the track driver the measurement reference signal outputted from the signal generating section, reference numeral 27 denotes a sinusoidal signal generating section for shifting a frequency from a first frequency to a second frequency, and reference numeral 28 denotes a phase detector for detecting a phase difference between the measurement reference signal inputted to the adder and the tracking control signal inputted thereto.

The switch 18 is turned on (Servo ON) and a state where the tracking servo is operated is formed. Next, a sinusoidal signal having, for example, an amplitude of 20 mVpp and a frequency of 30 Hz is inputted to the adder 26 from the sinusoidal signal generating section 27. The sinusoidal signal inputted to the adder 26 is inputted to the phase detector 28 via one servo loop including the track driver 12, the track actuator 7, the tracking error reproducing section 9, and the tracking servo 11.

The phase detector 28 compares phases of a signal inputted to the adder 26 and a signal traveling around the tracking servo block and detects the phase lag data to the sinusoidal signal frequency. When sweeping a frequency of the sinusoidal signal, for example, from 30 to 100 Hz, the phase detector 28 measures the phase lag data to the frequency and sequentially stores the data in the memory within the phase shift amount operation section 25.

The sweep upper limit frequency and the sweep lower limit frequency are measured in the range of the rotation frequency of the used optical disc. The operations of the phase measurement as well as of the data storage in the memory within the phase shift amount operation section 25 are performed once, for example, after an assembly of the optical disc drive apparatus (before shipping). By the above-described structure, the eccentricity compensation phase amount can be made proper to the one servo loop characteristic and the eccentricity compensation can be surely operated, according to the rotation frequency of the optical disc.

In the above-described embodiment, the phase characteristic is obtained by the measuring method and further can be previously calculated by the computing. As a result, the calculated value may be stored in the memory within the phase shift amount operation section.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc drive apparatus using an optical pickup main body, comprising:
   a track driving module for driving an optical pickup main body in a radial direction;
   a tracking error detecting module for detecting a tracking error signal of an optical disc;
   a track controlling module for outputting to the track driving module a tracking control signal for performing a follow-up control of a track on the optical disc based on the tracking error detection result;

a rotation control driving module for subjecting the optical disc to a rotation control drive;

a rotation angle detecting module for detecting a rotation angle of the optical disc;

an eccentricity compensation reference signal generating module for outputting a predetermined sinusoidal signal according to a rotation angle of the optical disc;

an eccentricity amount detecting module for detecting an eccentricity amount of the optical disc; and an amplifying module for outputting to the track driving module an amplifier output signal in which the eccentricity compensation reference signal increases and decreases based on the eccentricity amount detection result;

an angular velocity detecting module for detecting an angular velocity of the optical disc;

a phase shifting module for shifting based on the angular velocity detection result a phase of the eccentricity compensation reference signal relative to a rotation angle of the optical disc;

a signal generating module for shifting a frequency from a first frequency to a second frequency;

a phase difference detecting module for detecting a phase difference between a measurement reference signal outputted from the signal generating module and a tracking control signal outputted from the track controlling module; and a storing module, storing a frequency value of the measurement reference signal and the phase difference detection result;

wherein the phase shifting module reads a phase difference value from the storing module according to a rotation frequency of the optical disc and for shifting a phase of the eccentricity compensation reference signal according to the phase difference.

* * * * *